(12) United States Patent
Dinev

(10) Patent No.: US 9,509,904 B2
(45) Date of Patent: Nov. 29, 2016

(54) USER PROGRAMMABLE IMAGE CAPTURING AND PROCESSING DEVICE

(71) Applicant: Imperx, Inc., Boca Raton, FL (US)

(72) Inventor: Petko Dimitrov Dinev, Boca Raton, FL (US)

(73) Assignee: Imperx, Inc., Boca Raton, FL (US)

( * ) Notice: Subject to any disclaimer, the term of this patent is extended or adjusted under 35 U.S.C. 154(b) by 323 days.

(21) Appl. No.: 14/259,234

(22) Filed: Apr. 23, 2014

(65) Prior Publication Data

US 2015/0312475 A1 Oct. 29, 2015

(51) Int. Cl.
*H04N 5/225* (2006.01)
*H04N 5/232* (2006.01)
*H04N 5/32* (2006.01)
*H04N 5/33* (2006.01)

(52) U.S. Cl.
CPC ...... *H04N 5/23225* (2013.01); *H04N 5/23229* (2013.01); *H04N 5/32* (2013.01); *H04N 5/33* (2013.01)

(58) Field of Classification Search
CPC ...... H04N 5/23225; H04N 5/32; H04N 5/33; H04N 5/23229
USPC ............ 348/207.1, 207.11, 552, 222.1
See application file for complete search history.

(56) References Cited

U.S. PATENT DOCUMENTS

| | | | |
|---|---|---|---|
| 6,889,172 B2 | 5/2005 | Sierer et al. | |
| 7,013,232 B2 | 3/2006 | Fuller, III et al. | |
| 7,016,811 B2 | 3/2006 | Peck et al. | |
| 7,050,923 B2 | 5/2006 | Fuller, III et al. | |
| 7,327,396 B2 | 2/2008 | Schultz et al. | |
| 7,526,535 B2 | 4/2009 | Peck et al. | |
| 7,532,249 B2 | 5/2009 | Schultz et al. | |
| 7,536,269 B2 | 5/2009 | Sierer et al. | |
| 7,558,694 B2 | 7/2009 | Fuller, III et al. | |
| 7,627,695 B2 | 12/2009 | Peck et al. | |
| 7,630,854 B2 | 12/2009 | Sierer et al. | |
| 7,791,671 B2 | 9/2010 | Schultz et al. | |
| 7,982,795 B2 | 7/2011 | Spatharis | |
| 8,050,882 B2 | 11/2011 | Sierer et al. | |
| 8,352,209 B2 | 1/2013 | Sierer et al. | |
| 2003/0036873 A1 | 2/2003 | Sierer et al. | |
| 2003/0036874 A1 | 2/2003 | Fuller, III et al. | |
| 2003/0036875 A1 | 2/2003 | Peck et al. | |
| 2003/0036876 A1 | 2/2003 | Fuller, III et al. | |
| 2005/0125512 A1 | 6/2005 | Fuller, III et al. | |
| 2005/0137840 A1 | 6/2005 | Peck et al. | |
| 2005/0144523 A1 | 6/2005 | Sierer et al. | |
| 2005/0262383 A1 | 11/2005 | Sierer et al. | |

(Continued)

OTHER PUBLICATIONS

Imperx Custom Imaging Solutions. http://imperx.com/custom-imaging-solutions/ Last visited on Apr. 23, 2014.

*Primary Examiner* — Yogesh Aggarwal

(74) *Attorney, Agent, or Firm* — Jon Gibbons; Fleit Gibbons Gutman Bongini & Bianco, P.L.

(57) ABSTRACT

The present description provides a user programmable image capturing and processing apparatus which allows the user to load and run its own custom processing algorithms into the camera or device apparatus, does not limit the client to a specific set of factory preloaded image processing algorithms, and can utilize a wide range of image capturing means such as Ultrasound, X-ray, RF frequency, or other means of converting signals or waves to image.

20 Claims, 4 Drawing Sheets

(56) References Cited

U.S. PATENT DOCUMENTS

| | | |
|---|---|---|
| 2007/0016659 A1 | 1/2007 | Peck et al. |
| 2008/0007624 A1* | 1/2008 | Schultz .................. H04N 5/225 348/207.99 |
| 2009/0201379 A1 | 8/2009 | Schultz et al. |
| 2009/0210826 A1 | 8/2009 | Sierer et al. |
| 2010/0023866 A1 | 1/2010 | Peck et al. |
| 2010/0088194 A1 | 4/2010 | Sierer et al. |
| 2011/0225327 A1* | 9/2011 | Tom ........................ G06F 13/10 710/58 |
| 2011/0273553 A1 | 11/2011 | Spatharis |

\* cited by examiner

USER PROGRAMMABLE IMAGE CAPTURING AND PROCESSING DEVICE

BACKGROUND

The present description generally relates to a novel user programmable image capturing and processing device, more particularly, the device allows the user to load and run custom processing algorithms into the camera apparatus.

Almost every modern manufacturing process uses machine vision systems. These systems ensure fast, accurate and repeatable measurements, and thus guaranteeing a consistent product quality. The main component of every machine vision systems is an image capturing camera apparatus. The image capturing apparatus includes proprietary camera sensor processes developed by a vendor to provide a competitive and differentiated product. In a conventional machine vision systems the camera provides the image, and the image analysis is done on the user's host computer connected to the camera.

Recently new type machine vision systems—"smart cameras"—integrate the image capturing and analysis functions. These smart cameras have "on-board" hardware and/or software capabilities for advanced image processing and analysis, such as object recognition and object coordinate determination. In general, the image acquisition and processing capabilities of a smart camera are determined and fixed by the camera vendor. The user works with the vendor to modify the factory preprogrammed image analysis capabilities, to add new features, capabilities or custom specific algorithms. When the user discloses such processes, the confidential nature of the process of is jeopardized, particularly if the disclosure is to a vendor who also provides cameras systems to a competitor of the user. If the user wishes to switch to a different sensor technology, image resolution or camera system, then the user must again associate with the camera vendor on incorporating the user's analysis processes, while both the user and the vendor are required to take extra steps to protect their respective proprietary or secret processes.

SUMMARY

The present description provides a novel user programmable image capturing and processing apparatus, which allows the user to load and run its own custom processing algorithms into the camera apparatus, does not limit the client to a specific set of factory preloaded image processing algorithms, and can utilize a wide range of image capturing means while protecting proprietary processes of both the user and the camera vendor.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various examples and to explain various principles and advantages all in accordance with the present description, in which.

DETAILED DESCRIPTION

Figure 1:
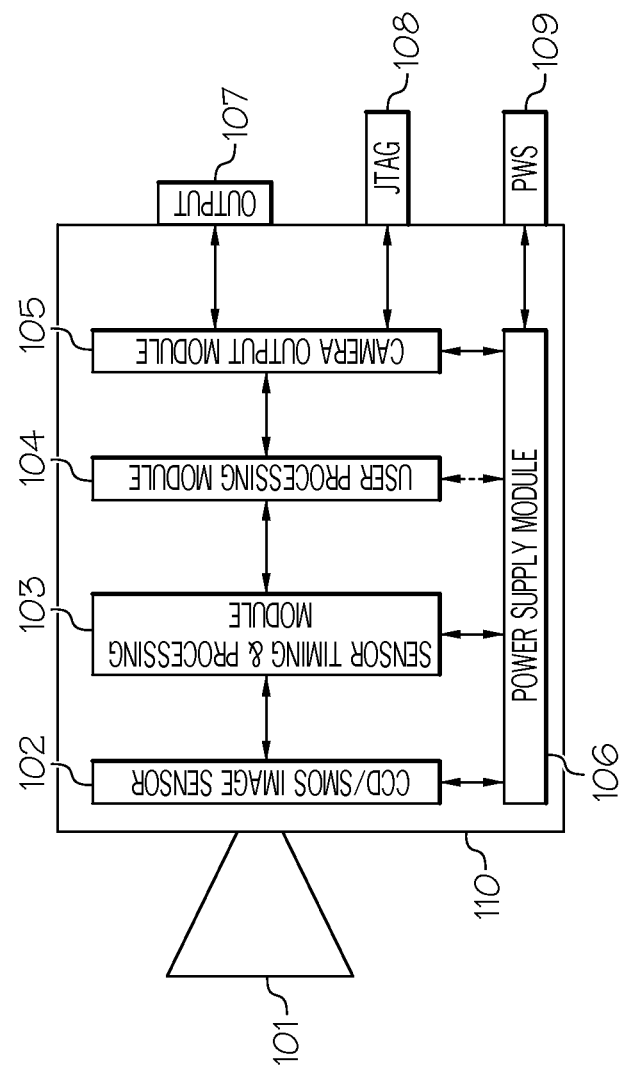
FIG. 1 shows an example block diagram of a user programmable image capturing and processing apparatus utilizing a single processing board, where the image capturing is done using a CCD or CMOS image sensors.

As required, detailed examples are disclosed herein; however, it is to be understood that the disclosed are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present disclosure is presented for purposes of illustration and description, but is not intended to be exhaustive or limited in the form disclosed. Many modifications and variations will be apparent without departing from the scope of the description. The examples are chosen and described in order to best explain the principles of the description and the practical application, and to enable others to understand the description for various examples with various modifications as are suited to the particular use contemplated.

According to one example, the light received from a lens is focused into the surface of the camera sensor, where the light is converted to a digital signal representing a scene being imaged. The sensor processing and timing module generates all necessary signal to ensure proper operation of the CCD or CMOS sensor, and also receives all signal from the sensor, processes the video signal and conditions it for further processing. The conditioned video signal from the sensor module is transferred to the user processing module for further custom processing. Many user processing modules can be connected simultaneously. The sensor and the user processing modules may comprise of one or several, identical or different processors, microcontroller, DSP, CPU, ARM, or any programmable hardware like CPLD or FPGA.

The sensor and the user processing modules may also have a JTAG or similar port for programming. The JTAG ports of the sensor and the user processors are connected in one or several JTAG chains. The user's access to the sensor processor through the JTAG port may be regulated or inhibited. The user processor holds all custom algorithms and the user can reprogram the second processor via the JTAG or similar port for programming without any restrictions. After all user specific processing has been performed, the newly generated data stream representing the image after the custom processing, is sent to the camera output module, where the data stream is converted to the appropriate output format, which can be Analog, Camera link, GigE, GigE Vision, USB 2.0, USB 3.0, USB 3.0 Vision, FireWire (IEEE 1394), CoaxPress, Wireless Wi-Fi, Bluetooth or any standard or nonstandard output format. The image might be generated by utilizing Ultrasound, X-ray, RF frequency, or other means of converting signals or waves to image.

Furthermore, the image or scene capturing device of the present description is not limited to a optical light sensitive CCD or CMOS sensor, and there is other means of generations, utilizing acoustics, ultrasound, X-ray, RF frequency, or other means of converting signals to image. Thus, the description provides for a flexible user programmable image capturing and processing apparatus, which is not limited to a specific set of factory preloaded image processing algorithms, and can utilize a wide range of image capturing means.

The scene capturing device of the present description has all processes included within the device, and thus performs capture and analysis functions even if it is not connected to a network, or portions of network fail, thereby providing a more robust system. Also, the user may load processes directly into the device and does not have to purchase and install preprogrammed or reprogrammed PC Boards, modules, ICs or other components to incorporate the user's analysis processes into the device.

FIG. 1 shows an example block diagram of the user programmable image capturing and processing apparatus utilizing a single processing board, where the image capturing is done using a CCD or CMOS image sensors.

With reference to FIG. 1, an imaging lens 101 is connected to a camera housing 110, and may be optically coupled to a CCD or CMOS image sensor 102. The image sensor may be a single sensor or a combination of sensors. The sensor 102 is connected to a power supply module 106 and to a sensor timing and processing module 103. The sensor timing and processing module 103 includes a "sensor processor" which could comprise of one or several, identical or different processors, microcontrollers, ARM, DSP, CPU, or programmable hardware like CPLD or FPGA. The sensor processor may also have a JTAG or similar port for programming. The sensor timing and processing module 103 is connected to the power supply module 106 and to a user processing module 104.

The user processing module 104 includes a "user processor" which could comprise one or several, identical or different processors, microcontrollers, DSP, CPU, or programmable hardware CPLD or FPGA. The user processor may have a JTAG or similar port for programming, where some or all components are connected to the JTAG port. The user processing module 104 may include memory modules, microcontrollers, additional processors, DSP, or any hardware that will accomplish the scope of work. The user processing module 104 is connected to the power supply module 106 and to a camera output module 105. Output interface connector 107, JTAG connector 108 and a power connector 109 are connected to the camera housing 110 and to the output module 105. The JTAG ports of the sensor and the user processors are connected to the JTAG connector 108.

The light received from lens 101 is focused into the surface of the sensor 102, and converted to a digital signal representing the scene being imaged. The sensor processor of timing module 103 generates all necessary signal to ensure proper operation of the CCD or CMOS sensor, and also receives all signal from the sensor, processes the video signal and conditions it for further processing. The conditioned video signal from module 103 is transferred to the sensor timing and processing module 104 for further custom processing. The user processor holds user custom algorithms and the user can reprogram the second processor via the JTAG or similar port for programming without any restrictions. After all user specific processing has been performed, the newly generated data stream representing the image after the custom processing, is sent to the camera output module 105, where the data stream is converted to the appropriate output format, which may be Analog, Camera link, GigE, GigE Vision, USB 2.0, USB 3.0, USB 3.0 Vision, FireWire (IEEE 1394), CoaxPress, Wireless Wi-Fi, Bluetooth or any standard or nonstandard output format. The power supply module 106 provides the corresponding voltages to all modules. The power connector 109 provides the power to the module 106.

Figure 2:
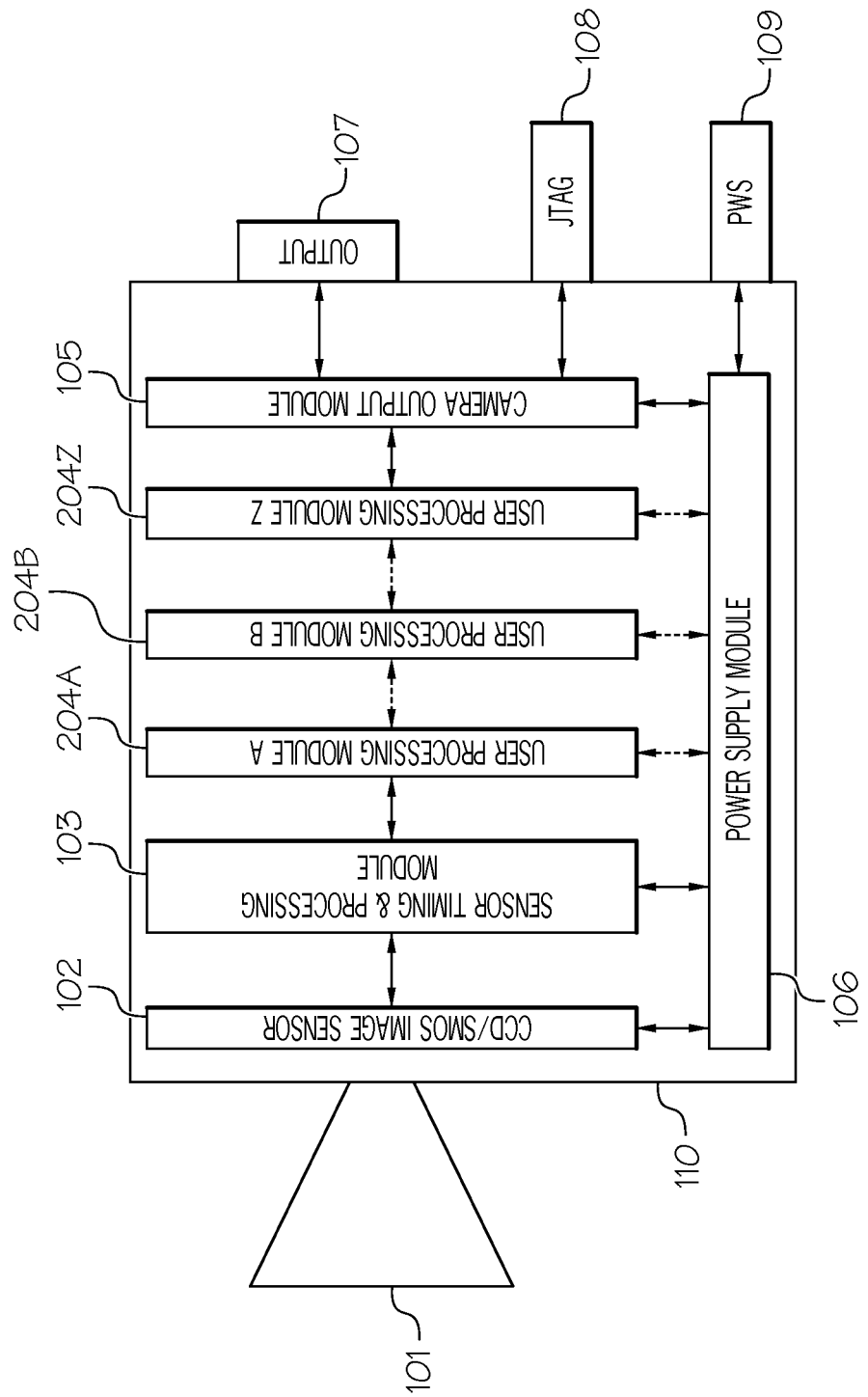
FIG. 2 shows example block diagram of the user programmable image capturing and processing apparatus with multiple user processing modules.

FIG. 2 shows example block diagram of the user programmable image capturing and processing apparatus with multiple user processing modules. The example of FIG. 2 is modified from and similar in structure shown in FIG. 1. In FIG. 2, like parts, which correspond to those in FIG. 1, are marked with the same reference numbers. In this modified design, an imaging lens 101 is connected to a camera housing 110, and is optically coupled to CCD or CMOS image sensor 102. The image sensor may be a single sensor or a combination of sensors. The sensor 102 is connected to a power supply module 106 and to a sensor timing and processing module 103. The module 103 includes a "sensor processor" which could comprise of one or several, identical or different processors, microcontrollers, ARM, CPU, or programmable hardware CPLD or FPGA. The camera processor may also have a JTAG or similar port for programming. The sensor timing and processing module 103 is connected to the power supply module 106 and to a first user processing module 204A. The module 204A includes a first "user processor" which could comprise of one or several, identical or different processors, microcontrollers, ARM, DSP, CPU, or programmable hardware like CPLD or FPGA. The user processor may have a JTAG or similar port for programming, where some or all components are connected to the JTAG port. The module 204A may include memory modules, microcontrollers, additional processors, DSP, or any hardware (HW) that will accomplish the scope of work. The first user processing module 204A is connected to a second processing module 204B. The module 204B which could be identical or substantially different from module 204A, includes a second "user processor" which could comprise of one or several, identical or different processors, DSP, CPU, or programmable hardware elements like CPLD or FPGA. In one example module 204A may analyze the image for a first object and module 204B may analyze the image for a second object. The user processor may have a JTAG or similar port for programming, where some or all components are connected to the JTAG port. The second user processing module 204B is coupled to a third processing module 204Z. The module 204Z which could be identical or substantially different from module 204B, includes a third "user processor" which could comprise of one or several, identical or different processors, microcontrollers, DSP, CPU, or programmable hardware CPLD or FPGA. The user processor may have a JTAG or similar port for programming, where some or all components are connected in one or several the JTAG ports. Many more processing modules can be connected one to another. The last processing module (module 204Z in this example) is connected to the power supply module 106 and to a camera output module 105. Output interface connector 107, JTAG connector 108 and a power connector 109 are connected to the camera housing 110 and to the output module 105. The JTAG ports of the sensor and all user processors are connected in one or several JTAG connectors 108. Thus, all modules 204A-204Z may be loaded with user processes while installed within the device 110.

The example of FIG. 2 has functionality similar to that as described in FIG. 1. The light received from lens 101 is focused into the surface of the sensor 102, where it is converted to a digital signal representing the scene being imaged. The sensor processor and timing module 103 generates all necessary signals to ensure proper operation of the CCD or CMOS sensor, and also receives all video signals from the sensor, processes the video signal and conditions the video signals for further processing. The conditioned video signals from module 103 are transferred to the first processing module 204A for further custom processing. The first user processor holds all custom algorithms and the user can reprogram the second processor via the JTAG or similar port for programming without any restrictions. The conditioned video signal from module 204A is transferred to the second processing module 204B for further custom processing. The second user processor holds all custom algorithms and the user can reprogram the second processor via the JTAG or similar port for programming without any restrictions. The conditioned video signal from module 204B is transferred to the third processing module 204Z for further custom processing. The user processor holds all custom algorithms and the user can reprogram the second processor via the JTAG or similar port for programming without any restrictions. Many more modules can be used. After all user specific processing has been performed by all the modules connected, the newly generated data stream representing the image after the custom processing, is sent to the camera output module 105, where the data stream is converted to the appropriate output format, which typically can be analog, Camera link, GigE, GigE Vision, USB 2.0, USB 3.0, USB 3.0 Vision, FireWire (IEEE 1394), CoaxPress, Wireless Wi-Fi, Bluetooth or any standard or nonstandard output format. The power supply module 106 provides the corresponding voltages to all modules. The power connector 109 provides the main camera power to the module 106.

Figure 3:
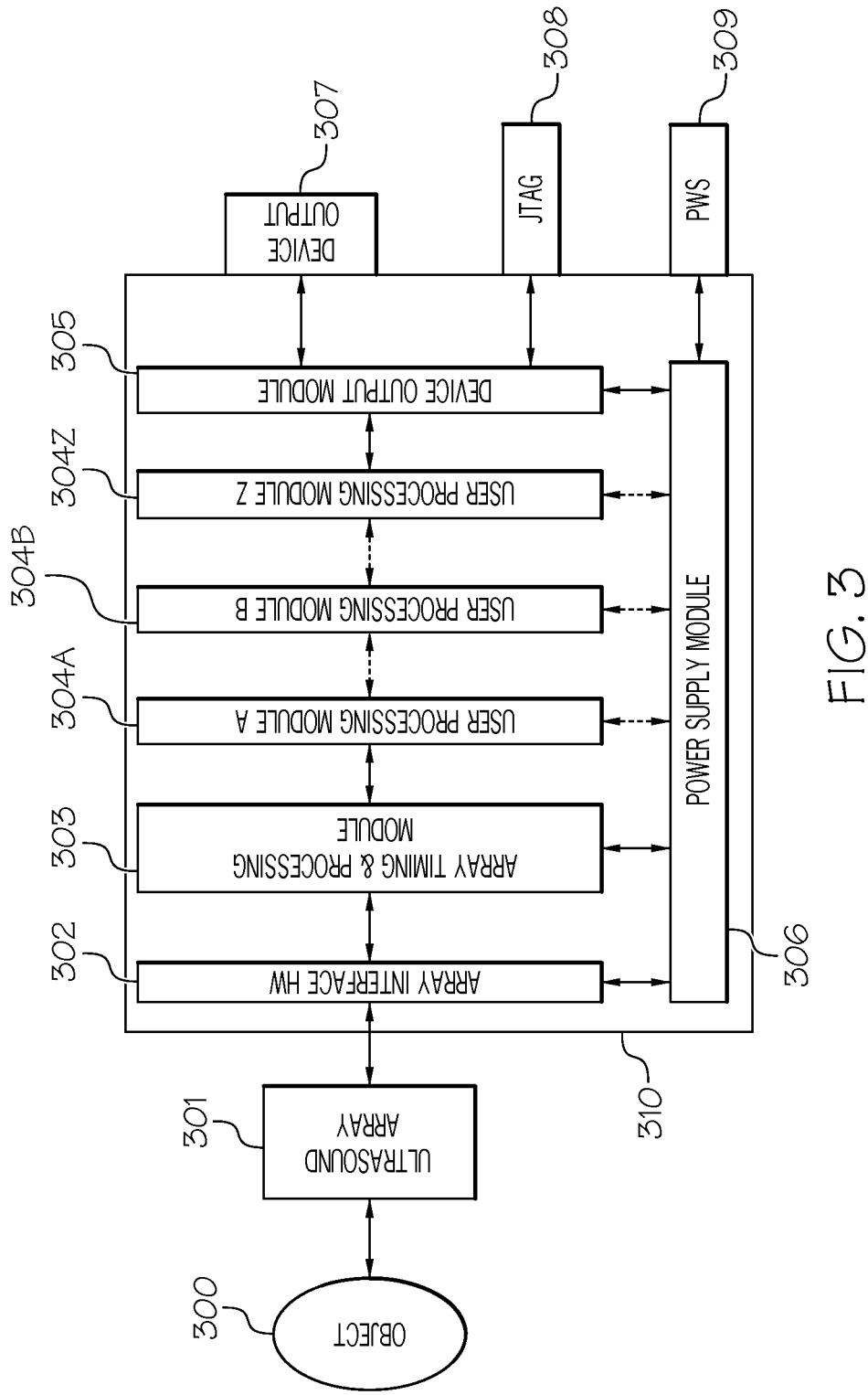
FIG. 3 shows example block diagram of the user programmable image capturing and processing apparatus with an ultrasonic array receiver.

FIG. 3 shows example block diagram of the user programmable image capturing and processing apparatus with an ultrasonic array receiver The example of FIG. 3 is modified from and similar in structure to the structure shown in FIG. 2. The ultrasound signal is irradiated from the array 301, propagates to the object under test 300, reflects back and is received from the array 301. The array interface hardware 302 generates the high voltage pulse which causes the transducer to irradiate the ultrasonic wave. Module 302 also receives the reflected signal from array 301. The timing and processor of timing module 303 generates all necessary signals to ensure proper transmit and receive operation of module 302, receives all signals from the module 301, processes the electrical signal and converts it to video signal for further processing. The converted video signal from module 303 is transferred to the first processing module 304A for further custom processing. The first user processor holds all custom algorithms and the user can reprogram the second processor via the JTAG or similar port for programming without any restrictions. The conditioned video signal from module 304A is transferred to the second processing module 304B for further custom processing. The second user processor holds all custom algorithms and the user can reprogram the second processor via the JTAG or similar port for programming without any restrictions. The conditioned video signal from module 304B is transferred to the third processing module 304Z for further custom processing. The user processor holds all custom algorithms and the user can reprogram the second processor via the JTAG or similar port for programming without any restrictions. Many more modules can be used. After all user specific processing has been performed by all the modules connected, the newly generated data stream representing the image after the custom processing, is sent to the device output module 305, where the data stream is converted to the appropriate output format, which typically can be Analog, Camera link, GigE, GigE Vision, USB 2.0, USB 3.0, USB 3.0 Vision, FireWire (IEEE 1394), CoaxPress, Wireless Wi-Fi, Bluetooth or any standard or nonstandard output format. The power supply module 306 provides the corresponding voltages to all modules. The power connector 309 provides the main camera power to the module 306.

Figure 4:
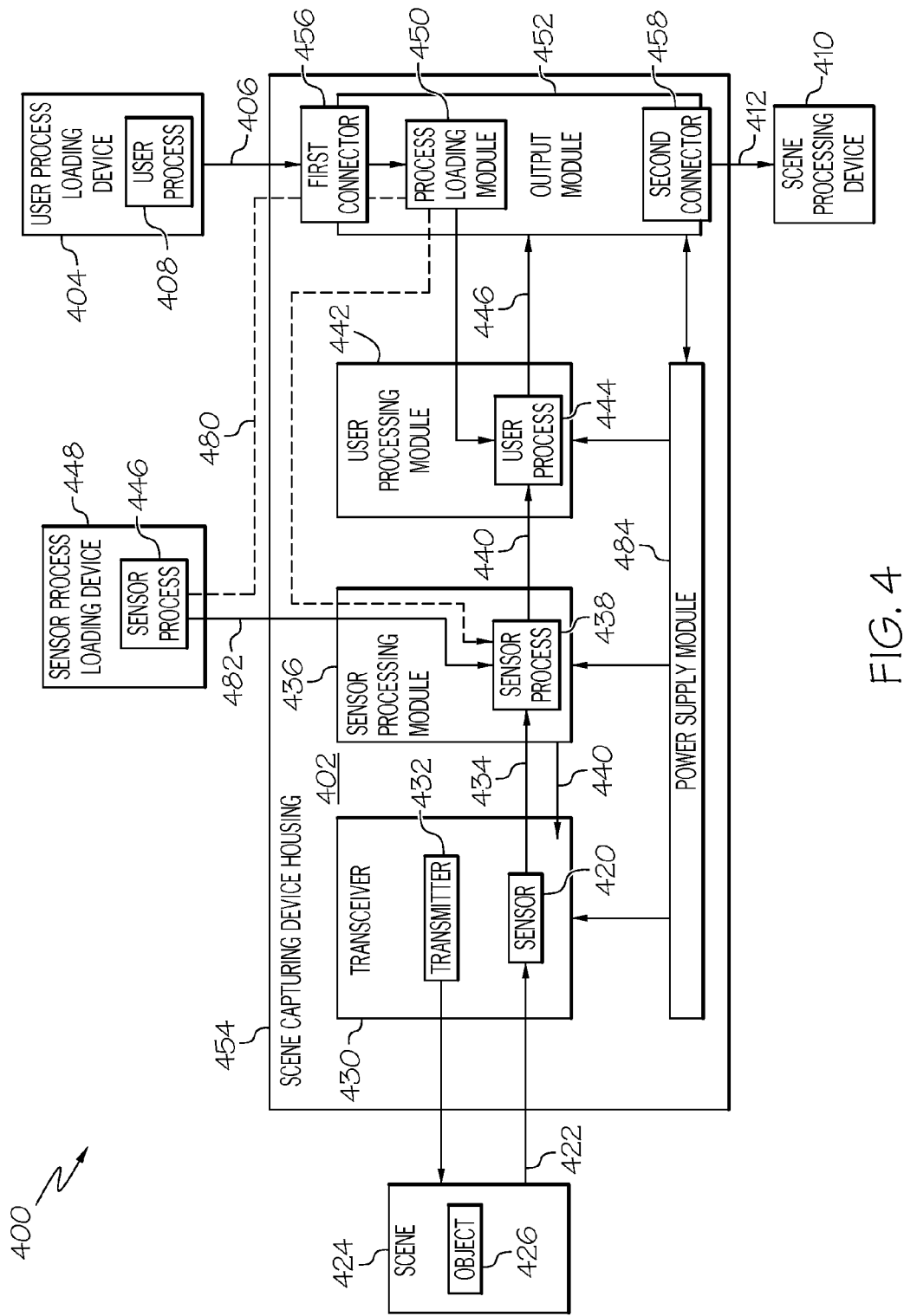
FIG. 4 shows an example block diagram of a user programmable scene capturing system.

FIG. 4 shows an example block diagram of a user programmable scene capturing system. The scene capturing system 400 comprises a scene capturing device 402 which includes functionality similar to devices 110 and 310 of FIG. 1-FIG. 3. A user process loading device 404 is removably coupled to the scene capturing device 402 with a first cable 406 and includes at least one user process 408 for use in device 402. The user process may be highly proprietary and the user may have good reason to limit the distribution of the process as the user process may provide the user with a competitive industrial or military advantage. A scene processing device 410 is removably coupled to the scene capturing device 402 with a second cable 412. The scene processing device 410 may be any of a number of devices defined by the user including for example a production line and a surveillance device or vehicle that may take advantage of a scene capturing device having user processes incorporated therein. For example, a user process may be a facial recognition process, a single or multiple object recognition process and or an object location and trajectory determination process. Incorporating such processes into the scene capturing device 402 can simplify the system design and partitioning, reduce digital bandwidth communication between system components, and reduce CPU loading of the user's scene processing device 410.

The scene capturing device 402 comprises a sensor 420 configured to capture scene signals 422 of a scene 424. Sensor 420 may include receiver functionality of items 101, 102, 301 and 302 of FIG. 1-FIG. 3. The scene 424 may be an image and may have an object 426 or may have multiple objects that may be processed by the user process. The sensor 420 may be a receiver included within a transceiver 430 also having a transceiver for irradiating the scene with energy receivable by the sensor. The energy transmitted and received by transceiver 430 may be acoustic or electromagnetic and may include acoustic, ultrasonic, radio frequency, infrared, optical, ultraviolet and/or X-ray energy. The sensor 420 produces digital signals 434 representative of the scene signals 422. In the case of the use of ambient energy to irradiate the scene or if the scene or object generates its own radiation, the transmitter 432 may not be required and the transceiver 430 may be simplified to the sensor 420, as shown in the devices of FIG. 1 and FIG. 2.

A sensor processing module 436 is coupled to the sensor 420 and includes functionality similar items 102, 103, 302, and 303 of FIG. 1-FIG. 3. The sensor processing module has a sensor process 438 adapted to cause the sensor processing module to generate sensor signals 440 for causing the sensor to produce the digital signals 434 and generate conditioned signals 440 based upon the digital signals 434. The sensor process 438 is configured to cause the sensor processing module 436 to generate sensor signals for causing the transceiver 430 to operate the transmitter 432 and produce the digital signals 434 from the sensor 420. The sensor process may be highly proprietary and it may be important to protect the sensor process from access by the user of the scene capturing device. Sensor process 438 may be functionally identical to sensor process 446 of the sensor process loading device 448, which may be used to load the sensor process into the sensor processing module 436.

A user processing module 442 is coupled to the sensor processing module 436 and includes functionality similar to items 104, 204A, 204B, 204Z, 304A, 304B, and 304Z of FIG. 1-FIG. 3. The user processing module has a user process 444 configured to process the conditioned signals 440 and generate a user data stream 446 based upon the conditioned signals. User process 444 may be functionally identical to user process 408 of the user process loading device 404.

A process loading module 450 includes at least some of the functionality of items 105, 108, 305 and 308 of FIG. 1-FIG. 3. The process loading module 450 is configured to receive the user process 408 from the user process loading device 404 and to load the user process into the user processing module 442 and inhibit access to the sensor process 438 while the user processing module 442 is coupled to the sensor processing module 436 and the sensor processing module is coupled to the sensor 420. Thus the user processing module need not be decoupled from the sensor processing module or removed from installation in the scene capturing device in order to load a user process or re-load an improved or debugged user process into the scene capturing device. In one example, the sensor process may be loaded from sensor process loading device 448 into the sensor processing module 436 through process loading module 450 via rout 480 through an interface such as a JTAG interface. In such an example process loading module enables a manufacture or vendor of the scene capturing device to load the sensor process. However, when the user process is loaded, access to the sensor process in inhibited by the process loading module. In one example, loading and other access to the sensor process 438 may be enabled through process loading module through a command sequence, jumper sequence or other secure approach. In another example sensor process loading device may be directly connected to the sensor processing module via rout 482 for loading of the sensor process.

An output module 452 has functionality similar to that of items 105 and 305 of FIG. 1-FIG. 3 and provides the user data stream 412 to the scene processing device 410. A housing 454 is configured to enclose the sensor, the sensor processing module, the user processing module, the process loading module, and the output module and may result in the scene capturing device being considered portable.

The output module 452 also includes a first connector 456 which may include functionality similar to items 108 and 308 of FIG. 1-FIG. 3, and is for connecting to the first cable 406 and for communicating the user process from the user process loading device 404 to the scene capturing device 402 while the user processing module is enclosed within the housing 454.

Output module 452 also includes a second connector 458 which may be similar in functionality to items 107 and 307 of FIG. 1-FIG. 3, and may be for connecting to the second cable 412 for communicating the user data stream from the scene capturing device 402 to the scene processing device 410, wherein the user process may be communicated from the user process loading device 404 to the scene capturing device 402 while scene capturing device 402 is connected to the scene processing device 410.

Cable 412, although described as a wired connection may be any form of wired or wireless connection in any of a number of protocols configured to provide the user data stream in a standard or non-standard data protocol to a scene processing device, the standard protocol including at least one of, Analog, Camera link, GigE, GigE Vision, USB 2.0, USB 3.0, USB 3.0 Vision, FireWire (IEEE 1394), Coax-Press, Wi-Fi, and Bluetooth.

The scene capturing device may further comprise a power supply module 484 configured to provide operating power to the sensor, the sensor processing module, the user processing module and the process loading module while the processing loading module is loading the user process into the user processing module. The power supply module 484 may be similar in functionality to items 106 and 306 of FIG. 1-FIG. 3. The output module 452 is configured to provide the user data stream in a standard data protocol to a scene processing device; and the housing 454 is configured to enclose the sensor, the sensor processing module, the user processing module, and the process loading module, the power supply module, and the output module, wherein the scene capturing device 402 is a portable scene capturing device included within the housing, and the user process is loaded into the user processing module 442 while the user processing module is enclosed within the housing 454.

In one example, the scene capturing comprises a programmable digital integrated circuit (not shown) configured to operate both the sensor process 438 and the user process 444. The programmable digital integrated circuit may be at least one of a microprocessor, a microcontroller, a reduced instruction set computer, an advanced reduced instruction set computer machine, a programmable discrete circuit, a field programmable array, a complex programmable logic device, and a programmable application specific integrated circuit.

In another example, the sensor processing module 436 includes a first programmable digital integrated circuit, and the user processing module 442 includes a second programmable digital integrated circuit wherein the process loading module 450 is configured to load the user process into the second programmable digital integrated circuit while inhibiting access to the first programmable digital integrated circuit. The first programmable digital integrated circuit may be at least one of a microprocessor, a microcontroller, a reduced instruction set computer, an advanced reduced instruction set computer machine, a programmable circuit, a field programmable array, a complex programmable logic device, and a programmable application specific integrated circuit, and the second programmable digital integrated circuit may be at least one of a microprocessor, a microcontroller, a reduced instruction set computer, an advanced reduced instruction set computer machine, a programmable circuit, a field programmable array, a complex programmable logic device, and a programmable application. In another example using multiple processing modules, the user processing module 442 may include at least second and third programmable digital integrated circuits, wherein the process loading module 450 is configured to load the user process into the at least second and third digital integrated circuits while inhibiting access to the first programmable digital integrated circuit.

The scene capturing device may include an optical sensor which may utilize CCD or CMOS technologies and the process loading module may conform to the joint test action group (JTAG) IEEE 1149.1 standard.

Accordingly, it should be appreciated that the present description provides a novel user programmable image capturing and processing apparatus, which allows the user to load and run its own custom processing algorithms into the camera apparatus, does not limit the user/client to a specific set of factory preloaded image processing algorithms, and can utilize a wide range of image capturing means.

Many modifications and variations could occur to someone skilled in the art upon reading and understanding the preceding detailed description. It is intended that the subject matter of the description be construed as including all such modifications and alterations insofar as they come within the scope of the appended claims or equivalents thereof.

Some modifications may include: the user programmable module may occupy several boards; the user programmable modules may be cascaded where several independent user programmable modules are used; the first processor and the second processor can be similar or different microcontroller, CPU, DSP, or ARM processors, or FPGAs from Altera, Xilinx, Lattice, or any CPLD or FPGA vendor; the camera can utilize a CCD or CMOS image sensor for image capturing; the image may be generated by utilizing Ultrasound, X-ray, RF frequency, or other means of converting signals or waves to image; the camera output may be any standard or non-standard interface such as Analog, Camera link, GigE, GigE Vision, USB 2.0, USB 3.0, USB 3.0 Vision, FireWire (IEEE 1394), CoaxPress, Wireless Wi-Fi, Bluetooth or any standard or nonstandard output format; the camera output interface connector, PWS connector and the JTAG can be combined in one or several connectors; and the array interface and the array timing modules can be combined in one. Any approach for transferring a process from a loading device 404, 448 to a processing module 436, 442 in addition to or in place of the JTAG approach may be used while remaining within the scope of this description, one example would be a universal asynchronous receive and transmit (UART) approach, other examples include any standard or nonstandard wired or wireless approach. Any approach for providing or distributing power may be used while remaining within the scope of the description, for example, modules 102-105, 204A-204Z, 302-305, 430, 436 and 442 may each have individual or independent power supplies or any combination of individual and shared power supplies may be utilized by the function of power supply modules 106, 306, and 484 may be used while remaining within the scope of this description.

The subject matter of this description includes a novel user programmable image capturing and processing apparatus, which allows the user to load and run its own custom processing algorithms into the camera or device apparatus. The apparatus includes at least one image sensor to capture the light and to convert it to an electrical signal, at least one sensor processing module, including at least one "sensor processor" to interface and control said image sensor, to process said electrical signal and to format it as a video data, at least one user processing module including a "user processor", to perform a user specific processing task and to host any custom algorithms, a power supply module to provide the required voltages for the proper operation, a camera output module to convert the processed video data stream to a recognizable video format, at least one output interface connector to provide the required video, power and the required user I/O interface and programming, and a camera housing to host all apparatus. The user processor allows the user to load multiple times any custom processing algorithms into it. The image sensor may be a CCD or CMOS imaging sensor. The recognizable video format may be an Analog, Gigabit Ethernet (GigE), Gigabit Vision Ethernet (GEV), CameraLink, CoaxPress, USB, USB Vision, FireWire (IEEE 1394), Wi-Fi wireless, or Bluetooth. The recognizable video format may be any nonstandard wired or wireless, digital or analog connection. The first processor and the second processor may be similar or different CPLDs or FPGAs from Altera, Xilinx, Lattice, or any CPLD or FPGA vendor. The first processor and the second processor can be similar or different microcontroller, CPU, DSP or ARM processors. The first processor and the second processor may be similar or different standard or nonstandard hardware able to perform the tasks required. The output interface connector may be several separate connectors for video, power and user interface and programming.

The subject matter of this description also includes a novel user programmable image capturing and processing apparatus which allows the user to load and run its own custom processing algorithms into the camera or device apparatus. The device comprises of at least one ultrasonic transducer to generate and capture ultrasonic waves and to convert it to an electrical signal, at least one transducer processing module, including at least one "sensor processor" to interface and control said transducer, to generate the required signals for transmission, to process said returned electrical signal and to format it as a video data, at least one user processing module including a "user processor", to perform a user specific processing task and to host any custom algorithms, a power supply module to provide the required voltages for the proper operation, a camera output module to convert the processed video data stream to a recognizable video format, at least one output interface connector to provide the required video, power and the required user I/O interface and programming, a device housing to host all apparatus. The user processor allows the user to load multiple times any custom processing algorithms into it. The ultrasound transducer is an array of transducers. The recognizable video format is an Analog, Gigabit Ethernet (GigE), Gigabit Vision Ethernet (GEV), CameraLink, CoaxPress, USB, USB Vision, FireWire (IEEE 1394), Wi-Fi wireless, or Bluetooth. The recognizable video format is any nonstandard wired or wireless connection. The first processor and the second processor can be similar or different CPLDs or FPGAs from Altera, Xilinx, Lattice, or any CPLD or FPGA vendor. The first processor and the second processor can be similar or different microcontroller, CPU, DSP or ARM processors. The first processor and the second processor may be similar or different standard or nonstandard HW able to perform the tasks required. The output interface connector may be several separate connectors for video, power and user interface and programming. The ultrasonic transducer is an X-ray device capable to generate and capture waves. The ultrasonic transducer is any device capable to generate and capture waves.

The description of the present application has been presented for purposes of illustration and description, but is not intended to be exhaustive or limited to the description in the form disclosed. Many modifications and variations will be apparent without departing from the scope of the description. The examples were chosen and described in order to best explain the principles of the description and the practical application, and to enable the understanding of the description for various examples with various modifications as are suited to the particular use.

What is claimed is:

1. A scene capturing device comprising:
    a sensor configured to capture scene signals from a scene and to produce digital signals representative of the scene signals;
    a sensor processing module coupled to the sensor, the sensor processing module having a sensor process configured to cause the sensor processing module to generate sensor signals for causing the sensor to produce the digital signals and generate conditioned signals based upon the digital signals;
a user processing module coupled to the sensor processing module, the user processing module having a user process configured to process the conditioned signals and generate a user data stream based upon the digital signals;
a process loading module configured to load the user process into the user processing module while inhibiting access to the sensor process while the user processing module is coupled to the sensor processing module and the sensor processing module is coupled to the sensor;
an output module configured to provide the user data stream to a scene processing device; and
a housing configured to enclose the sensor, the sensor processing module, the user processing module, and the process loading module, and the output module, wherein the user process is loaded into the user processing module while the user processing module is enclosed within the housing, wherein the output module includes
a first connector configured to connect to a first cable and to communicate the user process from a user process loading device to the scene capturing device while the user processing module is enclosed within the housing, and
a second connector for connecting to a second cable and for communicating the user data stream from the scene capturing device to the scene processing device.

2. The scene capturing device according to claim 1 further comprising
an output module configured to provide the user data stream in a standard data protocol to a scene processing device, the standard protocol including at least one of, Analog, Camera link, GigE, GigE Vision, USB 2.0, USB 3.0, USB 3.0 Vision, FireWire (IEEE 1394), CoaxPress, Wi-Fi, and Bluetooth.

3. The scene capturing device according to claim 1 further comprising a power supply module configured to provide operating power to the sensor, the sensor processing module, the user processing module and the process loading module while the processing loading module is loading the user process into the user processing module.

4. The scene capturing device according to claim 3 further comprising:
an output module configured to provide the user data stream in a standard data protocol to a scene processing device; and
a housing configured to enclose the sensor, the sensor processing module, the user processing module, and the process loading module, the power supply module, and the output module, wherein
the scene capturing device is a portable scene capturing device included within the housing, and
the user process is loaded into the user processing module while the user processing module is enclosed within the housing.

5. The scene capturing device according to claim 1 further comprising a programmable digital integrated circuit configured to operate both the sensor process and the user process.

6. The scene capturing device according to claim 5 wherein the programmable digital integrated circuit is at least one of a microprocessor, a microcontroller, a reduced instruction set computer, an advanced reduced instruction set computer machine, a programmable discrete circuit, a field programmable array, a complex programmable logic device, and a programmable application specific integrated circuit.

7. The scene capturing device according to claim 1 wherein
the sensor processing module includes a first programmable digital integrated circuit, and
the user processing module includes a second programmable digital integrated circuit
wherein the process loading module is configured to load the user process into the second programmable digital integrated circuit while inhibiting access to the first programmable digital integrated circuit.

8. The scene capturing device according to claim 7 wherein
the first programmable digital integrated circuit is at least one of a microprocessor, a microcontroller, a reduced instruction set computer, an advanced reduced instruction set computer machine, a programmable circuit, a field programmable array, a complex programmable logic device, and a programmable application specific integrated circuit, and
the second programmable digital integrated circuit is at least one of a microprocessor, a microcontroller, a reduced instruction set computer, an advanced reduced instruction set computer machine, a programmable circuit, a field programmable array, a complex programmable logic device, and a programmable application specific integrated circuit.

9. The scene capturing device according to claim 1 wherein
the sensor processing module includes a first programmable digital integrated circuit, and
the user processing module includes at least second and third programmable digital integrated circuits,
wherein the process loading module is configured to load the user process into the at least second and third digital integrated circuits while inhibiting access to the first programmable digital integrated circuit.

10. The scene capturing device according to claim 1 wherein the sensor includes an optical sensor.

11. The scene capturing device according to claim 10 wherein the optical sensor is one of a CCD and a CMOS integrated sensor.

12. The scene capturing device according to claim 1 wherein
the sensor is receiver included within a transceiver, and
the sensor process is configured to cause the sensor processing module to generate sensor signals for causing the transceiver to produce the digital signals.

13. The scene capturing device according to claim 12 wherein the transceiver is one of an acoustic, ultrasonic, radio frequency, infrared, optical, ultraviolet and X-ray transceiver.

14. The scene capturing device according to claim 1 wherein the process loading module conforms with a joint test action group IEEE 1149.1 standard.

15. A scene capturing system comprising:
a user process loading device; and
a scene capturing device removably coupled to the user process loading device with a first cable, the scene capturing device comprising:
a sensor configured to capture scene signals from a scene and for producing digital signals representative of the scene signals;

a sensor processing module coupled to the sensor, the sensor processing module having a sensor process adapted to cause the sensor processing module to generate sensor signals for causing the sensor to produce the digital signals and to generate conditioned signals based upon the digital signals;

a user processing module coupled to the sensor processing module, the user processing module having a user process configured to process the conditioned signals and generate a user data stream based upon the conditioned signals;

a process loading module configured to receive the user process from the user process loading device and to load the user process into the user processing module while inhibiting access to the sensor process while the user processing module is coupled to the sensor processing module and the sensor processing module is coupled to the sensor;

an output module for providing the user data stream to a scene processing device; and a first connector coupled to the output module and for connecting to the first cable for communicating the user process from the user process loading device to the scene capturing device while the user processing module is coupled to the process loading module.

16. The scene capturing system according to claim 15 wherein the scene capturing device further comprises
a housing configured to enclose the sensor, the sensor processing module, the user processing module, the process loading module, the output module and the first connector, wherein the user process is received through the first connector and loaded into the user processing module through the process loading module while the user processing module is enclosed within the housing.

17. The scene capturing system according to claim 16 further comprising
a scene processing device removably coupled to the scene capturing device with a second cable, and the scene capturing device further includes
a second connector configured to connect to the second cable and for communicating the user data stream from the scene capturing device to the scene processing device.

18. A scene capturing system comprising:
a scene capturing device;
a user process loading device removably coupled to the scene capturing device with a first cable; and
a scene processing device removably coupled to the scene capturing device with a second cable,
the scene capturing device comprising:
a sensor configured to capture scene signals of a scene and to produce digital signals representative of the scene signals;
a sensor processing module coupled to the sensor, the sensor processing module having a sensor process adapted to cause the sensor processing module to generate sensor signals for causing the sensor to produce the digital signals and generate conditioned signals based upon the digital signals;
a user processing module coupled to the sensor processing module, the user processing module having a user process configured to process the conditioned signals and generate a user data stream based upon the conditioned signals;
a process loading module configured to receive the user process from the user process loading device and to load the user process into the user processing module and inhibit access to the sensor process while the user processing module is coupled to the sensor processing module and the sensor processing module is coupled to the sensor;
an output module for providing the user data stream to the scene processing device; and
a housing configured to enclose the sensor, the sensor processing module, the user processing module, the process loading module, and the output module,
the output module including:
a first connector for connecting to the first cable and for communicating the user process from the user process loading device to the scene capturing device while the user processing module is enclosed within the housing; and
a second connector for connecting to the second cable for communicating the user data stream from the scene capturing device to the scene processing device, wherein the user process is communicated from the user process loading device to the scene capturing device while the scene capturing device is connected to the scene processing device.

19. A scene capturing system according to claim 18 further comprising
an output module configured to provide the user data stream in a standard data protocol to a scene processing device, the standard protocol including at least one of, Analog, Camera link, GigE, GigE Vision, USB 2.0, USB 3.0, USB 3.0 Vision, FireWire (IEEE 1394), CoaxPress, Wi-Fi, and Bluetooth.

20. The scene capturing device according to claim 18 wherein
the sensor is receiver included within a transceiver, and
the sensor process is configured to cause the sensor processing module to generate sensor signals for causing the transceiver to produce the digital signals and
wherein the transceiver is one of an acoustic, ultrasonic, radio frequency, infrared, optical, ultraviolet and X-ray transceiver.

* * * * *